(12) United States Patent
Penning et al.

(10) Patent No.: US 8,401,936 B2
(45) Date of Patent: *Mar. 19, 2013

(54) ARCHITECTURAL DESIGN FOR EXPENSE REIMBURSEMENT APPLICATION SOFTWARE

(75) Inventors: Jan Penning, Heidelberg (DE); Bernhard F. Kuhn, Bammental (DE); Andreas Reccius, Walldorf (DE); Thomas Hoffmann, Roemerberg (DE); Fabian Guenther, Mauer (DE)

(73) Assignee: SAP AG, Walldorf (DE)

( * ) Notice: Subject to any disclaimer, the term of this patent is extended or adjusted under 35 U.S.C. 154(b) by 1092 days.

This patent is subject to a terminal disclaimer.

(21) Appl. No.: 11/967,483

(22) Filed: Dec. 31, 2007

(65) Prior Publication Data
US 2009/0171818 A1 Jul. 2, 2009

(51) Int. Cl.
*G06Q 40/00* (2012.01)
(52) U.S. Cl. ........... 705/31; 75/7; 75/2; 75/30; 75/40; 75/322; 75/7.25; 235/379; 709/204; 719/317
(58) Field of Classification Search .......... 705/7, 19, 705/30–45, 2, 4, 322; 709/204; 719/317; 235/379
See application file for complete search history.

(56) References Cited

U.S. PATENT DOCUMENTS

| | | | |
|---|---|---|---|
| 4,947,321 A | 8/1990 | Spence et al. | |
| 5,550,734 A | 8/1996 | Tarter et al. | |
| 5,560,005 A | 9/1996 | Hoover et al. | |
| 5,586,312 A | 12/1996 | Johnson et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,768,119 A | 6/1998 | Havekost et al. | |
| 5,822,585 A | 10/1998 | Nobel et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,881,230 A | 3/1999 | Christensen et al. | |
| 5,893,106 A | 4/1999 | Brobst et al. | |
| 5,918,219 A | 6/1999 | Isherwood | |

(Continued)

FOREIGN PATENT DOCUMENTS

| WO | 00/23874 | 4/2000 |
|---|---|---|
| WO | WO 2004/083984 | 9/2004 |

(Continued)

OTHER PUBLICATIONS

Assessment in the Evaluation of Self-Regulation as a Process, Educational Psychology Review v18n3 p. 297-306, Sep. 2006.*

(Continued)

*Primary Examiner* — Tien Nguyen
(74) *Attorney, Agent, or Firm* — Fish & Richardson P.C.

(57) ABSTRACT

Methods, systems, and apparatus, including computer program products, for implementing a software architecture design for a software application implementing expense reimbursement. The application is structured as multiple process components interacting with each other through service interfaces, and multiple service operations, each being implemented for a respective process component. The process components include an Expense and Reimbursement Management process component, a Due Item Processing process component, a Payment Processing process component, a Payroll Processing process component, and an Accounting process component.

17 Claims, 11 Drawing Sheets

U.S. PATENT DOCUMENTS

| | | | |
|---|---|---|---|
| 5,987,247 A | 11/1999 | Lau | |
| H001830 H | 1/2000 | Petrimoulx et al. | |
| 6,028,997 A | 2/2000 | Leymann et al. | |
| 6,049,838 A | 4/2000 | Miller et al. | |
| 6,070,197 A | 5/2000 | Cobb et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,208,345 B1 | 3/2001 | Sheard et al. | |
| 6,272,672 B1 | 8/2001 | Conway | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Constanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 * | 4/2004 | Blossman et al. | 709/206 |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,764,009 B2 | 7/2004 | Melick et al. | |
| 6,789,252 B1 | 9/2004 | Burke et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,766 B2 | 7/2006 | Wirts et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 | 10/2006 | Rush et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 | 10/2007 | Loghmani et al. | |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,415,697 B1 | 8/2008 | Houlding | |
| 7,418,409 B1 | 8/2008 | Goel | |
| 7,418,424 B2 | 8/2008 | Martin et al. | |
| 7,448,022 B1 | 11/2008 | Ram et al. | |
| 7,451,432 B2 | 11/2008 | Shukla et al. | |
| 7,461,030 B2 | 12/2008 | Hibler et al. | |
| 7,469,233 B2 | 12/2008 | Shooks et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,624,371 B2 | 11/2009 | Kulkarni et al. | |
| 7,631,291 B2 | 12/2009 | Shukla et al. | |
| 7,640,195 B2 | 12/2009 | Von Zimmermann et al. | |
| 7,640,291 B2 | 12/2009 | Maturana et al. | |
| 7,644,390 B2 | 1/2010 | Khodabandehloo et al. | |
| 7,657,406 B2 | 2/2010 | Tolone et al. | |
| 7,657,445 B1 * | 2/2010 | Goux | 705/3 |
| 7,665,083 B2 | 2/2010 | Demant et al. | |
| 7,668,761 B2 | 2/2010 | Jenkins et al. | |
| 7,672,888 B2 | 3/2010 | Allin et al. | |
| 7,681,176 B2 | 3/2010 | Wills et al. | |
| 7,693,586 B2 | 4/2010 | Dumas et al. | |
| 7,703,073 B2 | 4/2010 | Illowsky et al. | |
| 7,739,160 B1 | 6/2010 | Ryan et al. | |
| 7,742,985 B1 | 6/2010 | Digrigoli et al. | |
| 7,747,980 B2 | 6/2010 | Illowsky et al. | |
| 7,765,156 B2 | 7/2010 | Staniar et al. | |
| 7,765,521 B2 | 7/2010 | Bryant | |
| 7,788,145 B2 | 8/2010 | Wadawadigi et al. | |
| 7,797,698 B2 | 9/2010 | Diament et al. | |
| 7,814,142 B2 | 10/2010 | Mamou et al. | |
| 7,822,682 B2 | 10/2010 | Arnold et al. | |
| 7,835,971 B2 | 11/2010 | Stockton et al. | |
| 7,904,350 B2 | 3/2011 | Ayala et al. | |
| 7,925,985 B2 | 4/2011 | Moore | |
| 2002/0026394 A1 | 2/2002 | Savage et al. | |
| 2002/0042756 A1 | 4/2002 | Kumar et al. | |
| 2002/0049622 A1 | 4/2002 | Lettich et al. | |
| 2002/0073114 A1 | 6/2002 | Nicastro et al. | |
| 2002/0078046 A1 | 6/2002 | Uluakar et al. | |
| 2002/0082892 A1 | 6/2002 | Raffel et al. | |
| 2002/0103660 A1 | 8/2002 | Cramon et al. | |
| 2002/0107826 A1 | 8/2002 | Ramachandran et al. | |
| 2002/0120553 A1 | 8/2002 | Bowman-Amuah | |
| 2002/0133368 A1 | 9/2002 | Strutt et al. | |
| 2002/0138281 A1 | 9/2002 | Cirulli et al. | |
| 2002/0138358 A1 | 9/2002 | Scheer | |
| 2002/0143598 A1 | 10/2002 | Scheer | |
| 2002/0156695 A1 | 10/2002 | Edwards | |
| 2002/0161907 A1 | 10/2002 | Moon | |
| 2002/0184111 A1 | 12/2002 | Swanson | |
| 2002/0188486 A1 | 12/2002 | Gil et al. | |
| 2002/0198798 A1 | 12/2002 | Ludwig et al. | |
| 2002/0198828 A1 | 12/2002 | Ludwig et al. | |
| 2003/0009754 A1 | 1/2003 | Rowley et al. | |
| 2003/0069774 A1 | 4/2003 | Hoffman et al. | |
| 2003/0074271 A1 | 4/2003 | Viswanath et al. | |
| 2003/0074360 A1 | 4/2003 | Chen et al. | |
| 2003/0083762 A1 | 5/2003 | Farrah et al. | |
| 2003/0084127 A1 | 5/2003 | Budhiraja et al. | |
| 2003/0130860 A1 | 7/2003 | Datta et al. | |

| | | |
|---|---|---|
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0111304 A1 | 6/2004 | Meka et al. |
| 2004/0128180 A1 | 7/2004 | Abel et al. |
| 2004/0153359 A1 | 8/2004 | Ho et al. |
| 2004/0158506 A1 | 8/2004 | Wille |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1* | 12/2004 | Mitchell et al. ............. 705/30 |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1* | 6/2006 | Akbay et al. ............. 705/1 |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070336 A1 | 3/2010 | Koegler et al. |

FOREIGN PATENT DOCUMENTS

WO WO 2005/114381 12/2005

OTHER PUBLICATIONS

Activity Fund Accounting, School Business Affairs v49n6 p. 50-52, Jun. 1983.*
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesinguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

Anon,; "Sequest Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for WINDOWS® Shipments in First Nine Months of Availability"; PR Newswire; Apr. 28, 1997.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

"Hudson's Bay Company Realizes Fast ROI with the Oracle E-Business Suite"; PR Newswire; New York; Jan. 15, 2002; p. 1.

Woods, D.; "Packaged Composite Applications: A Liberating Force for the User Interface"; Internet Citation [online]; Oct. 2004; 4 pages; http://www.sapdesinguild.org/editions/edition7/print_composite_applications.asp.

Office Action issued in U.S. Appl. No. 11/323,041, filed Apr. 30, 2009; 26 pages.

Office Action issued in U.S. Appl. No. 11/322,612, filed May 11, 2009; 24 pages.

Office Action issued in U.S. Appl. No. 11/322,772, filed Mar. 25, 2009; 12 pages.
Office Action issued in U.S. Appl. No. 11/323,590, filed Jan. 9, 2009; 23 pages.
Office Action issued in U.S. Appl. No. 11/396,288, filed Jan. 2, 2009; 18 pages.
Office Action issued in U.S. Appl. No. 11/396,288, filed Apr. 15, 2008; 26 pages.
Office Action issued in U.S. Appl. No. 11/397,029, filed Jul. 21, 2009; 28 pages.
Office Action issued in U.S. Appl. No. 11/323,040, filed Jul. 24, 2009; 35 pages.
Office Action issued in U.S. Appl. No. 11/323,590, filed Jul. 10, 2009; 32 pages.
Office Action issued in U.S. Appl. No. 11/322,816, filed Jul. 23, 2006; 41 pages.
Office Action issued in U.S. Appl. No. 11/322,851, filed Sep. 2, 2009; 32 pages.
Office Action issued in U.S. Appl. No. 11/323,590, filed Dec. 30, 2009; 31 pages.
Office Action issued in U.S. Appl. No. 11/322,482, filed Jan. 7, 2010; 19 pages.
Office Action issued in U.S. Appl. No. 11/322,772, filed Dec. 9, 2009; 14 pages.
Office Action issued in U.S. Appl. No. 11/323,039, filed Sep. 4, 2009; 36 pages.
Office Action issued in U.S. Appl. No. 11/323,634, filed Sep. 10, 2009; 15 pages.
Office Action issued in U.S. Appl. No. 11/322,383, filed Nov. 12, 2009; 29 pages.
Office Action issued in U.S. Appl. No. 11/396,258, filed Nov. 25, 2009; 9 pages.
Office Action issued in U.S. Appl. No. 12/333,085, filed Jun. 25, 2009; 9 pages.
Office Action issued in U.S. Appl. No. 11/396,288, filed Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operatiosngs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312, filed Mar. 30, 2010; 23 pages.
Office Action issued in U.S. Appl. No. 11/322,611, filed Mar. 31, 2010; 17 pages.
Notice of Allowance issued in U.S. Appl. No. 11/322,610, filed Mar. 1, 2010; 12 pages.
Notice of Allowance issued in U.S. Appl. No. 11/322,610, filed Jun. 14, 2010; 6 pages.
Office Action issued in U.S. Appl. No. 11/322,772, filed Jul. 12, 2010; 18 pages.
Office Action issued in U.S. Appl. No. 11/322,398, filed Apr. 2, 2010; 39 pages.
Notice of Allowance issued in U.S. Appl. No. 11/322,398, filed Jul. 23, 2010; 38 pages.
Office Action issued in U.S. Appl. No. 11/322,383, filed May 12, 2010; 23 pages.
Office Action issued in U.S. Appl. No. 11/322,382, filed Mar. 29, 2010; 28 pages.
Office Action issued in U.S. Appl. No. 11/323,041, filed Mar. 19, 2010; 26 pages.
Advisory Action issued in U.S. Appl. No. 11/323,041, filed Jun. 7, 2010; 3 pages.
Notice of Allowance issued in U.S. Appl. No. 11/396,259, filed Mar. 29, 2010; 19 pages.
Notice of Allowance issued in U.S. Appl. No. 11/396,259, filed Jul. 6, 2010; 6 pages.
Notice of Allowance issued in U.S. Appl. No. 11/396,288, filed May 20, 2010; 15 pages.
Notice of Allowance issued in U.S. Appl. No. 11/396,258, filed Mar. 31, 2010; 9 pages.
Supplemental Notice of Allowance issued in U.S. Appl. No. 11/396,258, filed May 19, 2010; 8 pages.
Office Action issued in U.S. Appl. No. 11/396,236, filed Mar. 31, 2010; 20 pages.
Office Action issued in U.S. Appl. No. 11/323,039, filed Apr. 14, 2010; 15 pages.
Office Action issued in U.S. Appl. No. 11/322,851, filed May 12, 2010; 15 pages.
Office Action issued in U.S. Appl. No. 11/322,845, filed Jul. 15, 2010; 16 pages.

Office Action issued in U.S. Appl. No. 11/323,040, filed Apr. 29, 2010; 17 pages
Office Action issued in U.S. Appl. No. 11/322,612, filed Apr. 1, 2010; 23 pages.
Advisory Action issued in U.S. Appl. No. 11/322,612, filed Jun. 24, 2010; 3 pages.
Notice of Allowance issued in U.S. Appl. No. 11/397,026, filed Mar. 29, 2010; 17 pages.
Supplemental Notice of Allowance issued in U.S. Appl. No. 11/397,026, filed Jul. 9, 2010; 4 pages.
Notice of Allowance issued in U.S. Appl. No. 11/397,026, filed Jul. 26, 2010; 6 pages.
Notice of Allowance issued in U.S. Appl. No. 12/233,554, filed May 14, 2010; 11 pages.
Notice of Allowance issued in U.S. Appl. No. 12/233,534, filed Jun. 24, 2010; 15 pages.
Notice of Allowance issued in U.S. Appl. No. 12/327,354, filed Jun. 25, 2010; 16 pages.
Notice of Allowance issued in U.S. Appl. No. 11/967,865, filed Mar. 31, 2010; 16 pages.
Notice of Allowance issued in U.S. Appl. No. 11/322,482, filed Jul. 13, 2010; 5 pages.
Office Action issued in U.S. Appl. No. 11/323,590, filed Jun. 21, 2010; 25 pages.
Office Action issued in U.S. Appl. No. 11/323,634, filed Apr. 2, 2010; 9 pages.
Office Action issued in U.S. Appl. No. 11/322,816, filed Apr. 15, 2010; 27 pages.
Office Action issued in U.S. Appl. No. 11/396,327, filed Apr. 1, 2010; 26 pages.
Office Action issued in U.S. Appl. No. 12/333,085, filed Mar. 23, 2010; 5 pages.
SAP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312, filed Sep. 10, 2010; 23 pages.
Office Action issued in U.S. Appl. No. 11/322,611 on Sep. 16, 2010; 21 pages.
Notice of Allowance issued in U.S. Appl. No. 11/322,610, filed Sep. 23, 2010; 6 pages.
Notice of Allowance issued in U.S. Appl. No. 11/322,398, filed Oct. 29, 2010; 18 pages.
Notice of Allowanced issued in U.S. Appl. No. 11/322,398, filed Nov. 15, 2010; 20 pages.
Notice of Allowance issued in U.S. Appl. No. 1/322,382, filed Sep. 20, 2010; 6 pages.
Notice of Allowance issued in U.S. Appl. No. 11/396,259, filed Oct. 15, 2010; 6 pages.
Notice of Allowance issued in U.S. Appl. No. 11/396,288, filed Sep. 24, 2010; 4 pages.
Office Action issued in U.S. Appl. No. 11/396,250, filed Oct. 18, 2010; 15 pages.
Notice of Allowance issued in U.S. Appl. No. 11/396,258, filed Jul. 28, 2010; 9 pages.
Notice of Allowance issued in U.S. Appl. No. 11/396,258, filed Nov. 16, 2010; 8 pages.
Office Action issued in U.S. Appl. No. 11/396,236, filed Oct. 28, 2010; 19 pages.
Office Action issued in U.S. Appl. No. 11/323,040, filed Nov. 5, 2010; 33 pages.
Notice of Allowance issued in U.S. Appl. No. 11/397,026, filed Nov. 15, 2010; 7 pages.
Notice of Allowance issued in U.S. Appl. No. 12/233,554, filed Sep. 17, 2010; 10 pages.
Notice of Allowance issued in U.S. Appl. No. 11/968,054, filed Sep. 7, 2010; 11 pages.
Office Action issued in U.S. Appl. No. 12/233,557, filed Sep. 16, 2010; 16 pages.
Notice of Allowance issued in U.S. Appl. No. 12/233,534, filed Oct. 20, 2010; 15 pages.
Notice of Allowance issued in U.S. Appl. No. 12/327,354, filed Oct. 18, 2010; 16 pages.
Notice of Allowance issued in U.S. Appl. No. 11/967,865, filed Oct. 6, 2010; 6 pages.
Office Action issued in U.S. Appl. No. 11/322,973, filed Dec. 7, 2010; 13 pages.
Office Action issued in U.S. Appl. No. 11/404,147, filed Nov. 24, 2010; 27 pages.
Notice of Allowance issued in U.S. Appl. No. 12/333,085, filed Sep. 13, 2010; 8 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Office Action issued in U.S. Appl. No. 12/333,146, filed Sep. 6, 2011; 21 pages.
Office Action issued in U.S. Appl. No. 11/404,147, filed Aug. 4, 2011; 26 pages.
Notice of Allowance issued in U.S. Appl. No. 12/233,462, filed Sep. 2, 2011; 7 pages.
Office Action issued in U.S. Appl. No. 12/233,087, filed Aug. 18, 2011; 42 pages.
Notice of Allowance issued in U.S. Appl. No. 11/322,382, filed Jul. 25, 2011; 5 pages.
Notice of Allowance issued in U.S. Appl. No. 11/396,259, filed Aug. 5, 2011; 7 pages.
Notice of Allowance issued in U.S. Appl. No. 11/322,851, filed Sep. 2, 2011; 8 pages.
Office Action issued in U.S. Appl. No. 11/323,040, filed Jul. 26, 2011; 34 pages.
Notice of Allowance issued in U.S. Appl. No. 11/397,026, filed Jul. 20, 2011; 8 pages.
Notice of Allowance issued in U.S. Appl. No. 12/233,417, filed Sep. 14, 2011; 11 pages.
Notice of Allowance issued in U.S. Appl. No. 11/968,054, filed Aug. 2; 5 pages.
Notice of Allowance issued in U.S. Appl. No. 12/327,354, filed Aug. 9, 2011; 13 pages.
Office Action issued in U.S. Appl. No. 11/967,387, filed Sep. 8, 2011; 14 pages.
Office Action issued in U.S. Appl. No. 12/233,075, filed Aug. 4, 2011; 45 pages.
Notice of Allowance issued in U.S. Appl. No. 11/967,890, filed Jul. 15, 2011; 7 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "Powered by SAP NetWeaver Partner Program—Frequently Asked Questions"; May 2005; 10 pages. [online] http://www.lionbridge.com/NR/rdonlyres/4940BE1F/DA46/412E/AB16/F049BD865CA1/0/PBMWFAQ_50070686_en.pdf.

Notice of Allowance issued in U.S. Appl. No. 11/396,259, filed Jan. 20, 2011; 6 pages.

Notice of Allowance issued in U.S. Appl. No. 12/233,554, filed Feb. 22, 2011; 7 pages.

Notice of Allowance issued in U.S. Appl. No. 12/233,554, filed Jun. 27, 2011; 7 pages.

Office Action issued in U.S. Appl. No. 12/233,550, filed Jan. 12, 2011; 29 pages.

Notice of Allowance issued in U.S. Appl. No. 12/233,550, filed May 11, 2011; 20 pages.

Notice of Allowance issued in U.S. Appl. No. 12/327,354, filed Feb. 1, 2011; 16 pages.

Office Action issued in U.S. Appl. No. 11/323,634, filed Apr. 29, 2011; 8 pages.

Office Action issued in U.S. Appl. No. 11/322,973, filed May 27, 2011; 15 pages.

Notice of Allowance issued in U.S. Appl. No. 11/396,327, filed Nov. 30, 2010; 28 page.

Notice of Allowance issued in U.S. Appl. No. 12/233,462, filed Feb. 2, 2011; 11 pages.

Notice of Allowance issued in U.S. Appl. No. 12/233,462, filed May 18, 2011; 6 pages.

Office Action issued in U.S. Appl. No. 12/233,457, filed May 26, 2011; 19 pages.

Office Action issued in U.S. Appl. No. 12/327,232, filed May 26, 2011; 20 pages.

Office Action issued in U.S. Appl. No. 12/327,590, filed Jun. 23, 2011; 16 pages.

Notice of Allowance issued in U.S. Appl. No. 12/233,534, filed Jan. 31, 2011; 15 pages.

Notice of Allowance issued in U.S. Appl. No. 12/233,534, filed May 16, 2011; 12 pages.

Notice of Allowance issued in U.S. Appl. No. 1/322,382, filed Jan. 6, 2011; 7 pages.

Notice of Allowance issued in U.S. Appl. No. 11/322,610, filed Dec. 22, 2010; 6 pages.

Notice of Allowance issued in U.S. Appl. No. 11/322,610, filed Mar. 31, 2011; 6 pages.

Notice of Allowanced issued in U.S. Appl. No. 11/322,398, filed May 27, 2011; 21 pages.

Notice of Allowance issued in U.S. Appl. No. 11/396,288, filed Dec. 28, 2010; 4 pages.

Notice of Allowance issued in U.S. Appl. No. 11/396,250, filed Mar. 2, 2011; 13 pages.

Notice of Allowance issued in U.S. Appl. No. 11/396,250, filed Jun. 24, 2011; 5 pages.

Notice of Allowance issued in U.S. Appl. No. 11/396,258, filed Jun. 28, 2011; 9 pages.

Notice of Allowance issued in U.S. Appl. No. 11/322,845, filed Dec. 27, 2010; 16 pages.

Notice of Allowance issued in U.S. Appl. No. 11/322,845, filed Apr. 8, 2011; 8 pages.

Notice of Allowance issued in U.S. Appl. No. 11/397,026, filed Mar. 3, 2011; 6 pages.

Office Action issued in U.S. Appl. No. 12/233,417, filed Apr. 7, 2011; 32 pages.

Office Action issued in U.S. Appl. No. 12/233,530, filed Apr. 29, 2011; 11 pages.

Office Action issued in U.S. Appl. No. 11/967,405, filed Apr. 27, 2011; 15 pages.

Office Action issued in U.S. Appl. No. 12/233,557, filed Mar. 4, 2011; 19 pages.

Office Action issued in U.S. Appl. No. 12/233,489, filed May 13, 2011; 15 pages.

Office Action issued in U.S. Appl. No. 11/967,393, filed Apr. 15, 2011; 12 pages.

Notice of Allowance issued in U.S. Appl. No. 11/967,865, filed Jun. 24, 2011; 8 pages.

* cited by examiner

ARCHITECTURAL DESIGN FOR EXPENSE REIMBURSEMENT APPLICATION SOFTWARE

BACKGROUND

The subject matter of this patent application relates to computer software architecture, and, more particularly, to the architecture of application software for expense reimbursement.

Enterprise software systems are generally large and complex. Such systems may require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for an expense reimbursement software application.

In various aspects, the software architecture design can be implemented as methods, systems, and apparatus, including computer program products, for implementing a software architecture design for a software application implementing expense reimbursement. The application is structured as multiple process components interacting with each other through service operations, each implemented for a respective process component. The process components include an Expense and Reimbursement Management process component, a Due Item Processing process component, a Payment Processing process component, a Payroll Processing process component, and an Accounting process component.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
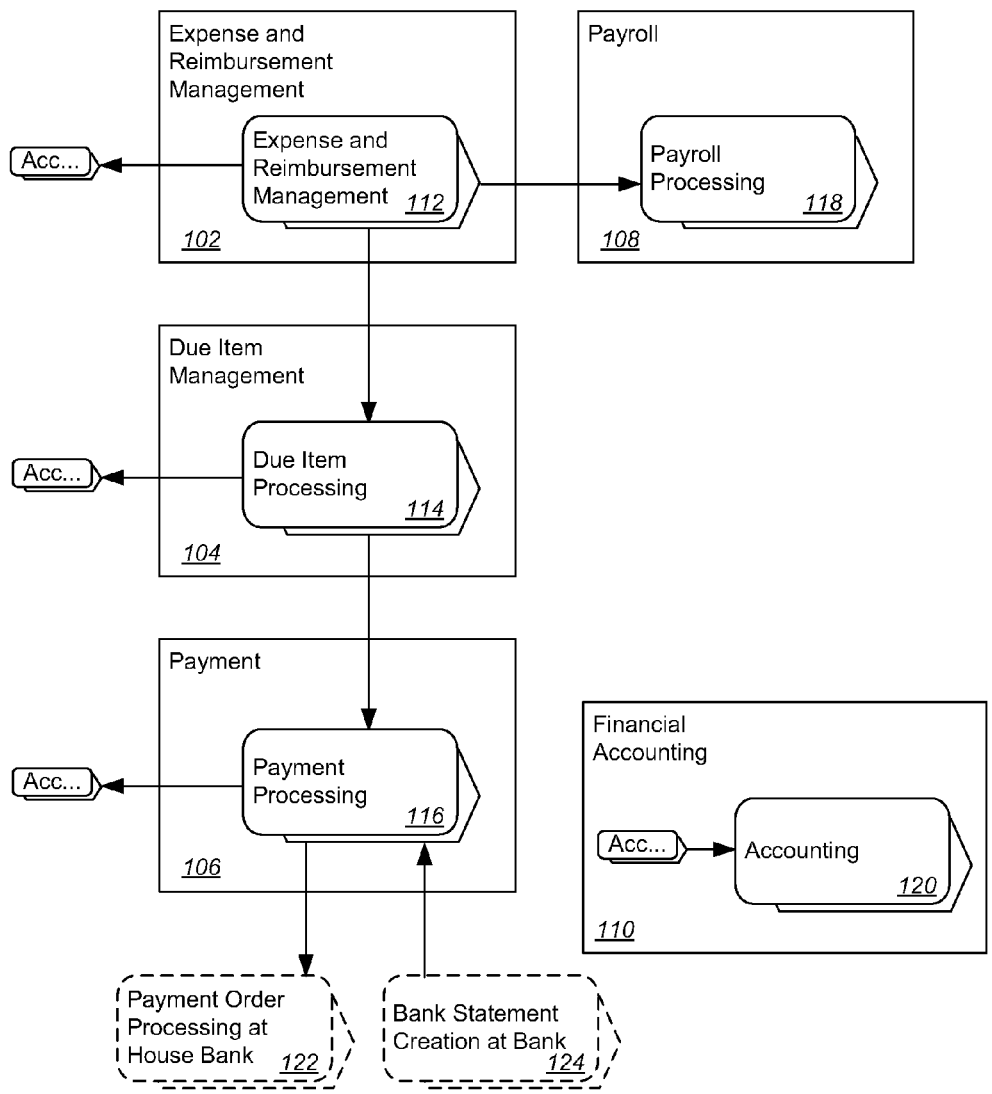
FIG. 1 is a block diagram of a software architectural design for an expense reimbursement software application.

FIG. 1 shows the software architectural design for an expense reimbursement software application. The expense reimbursement application is software that captures, processes, and/or pays expenses for internal or external employees.

As shown in FIG. 1, the expense reimbursement design includes five deployment units: an Expense and Reimbursement Management deployment unit 102, a Due Item Management deployment unit 104, a Payment deployment unit 106, a Payroll deployment unit 108, and a Financial Accounting deployment unit 110.

The Expense and Reimbursement Management deployment unit 102 includes an Expense and Reimbursement Management process component 112 that involves the management and/or monitoring of expenses incurred by employees, and/or the reimbursement of such expenses to employees. In some implementations, it comprises the process of: verifying the validity of expenses submitted by internal or external employees, settling the expenses in conformance with legal requirements and company policy, reimbursing the expenses to the employees, transferring the expenses to financial accounting, and/or transferring taxable amounts to payroll for internal employees.

The Due Item Management deployment unit 104 includes a Due Item Processing process component 114 that involves the collection, management, and/or monitoring of trade receivables or payables and/or corresponding sales tax or withholding tax.

The Payment deployment unit 106 includes a Payment Processing process component 116 that involves the processing and/or management of all payments. The Payment Processing process component 116 may also responsible for the associated communication with financial institutions such as banks, and/or provides the primary input for liquidity management.

The Payroll deployment unit 108 includes a Payroll Processing process component 118 that involves the execution and/or monitoring of regular and/or off-cycle payroll processes. The processes may include completeness checks of payroll relevant employee data, the payroll run itself, verification of the results, and/or the transfer to financial accounting.

The Financial Accounting deployment unit 110 includes an Accounting process component 120 that records business transactions for valuation and/or profitability analysis.

A number of external process components, described below, may be used to describe the architectural design. These can include, in some implementations, a Payment Order Processing at House Bank process component 122 and/or a Bank Statement Creation at Bank process component 124.

Figure 2:
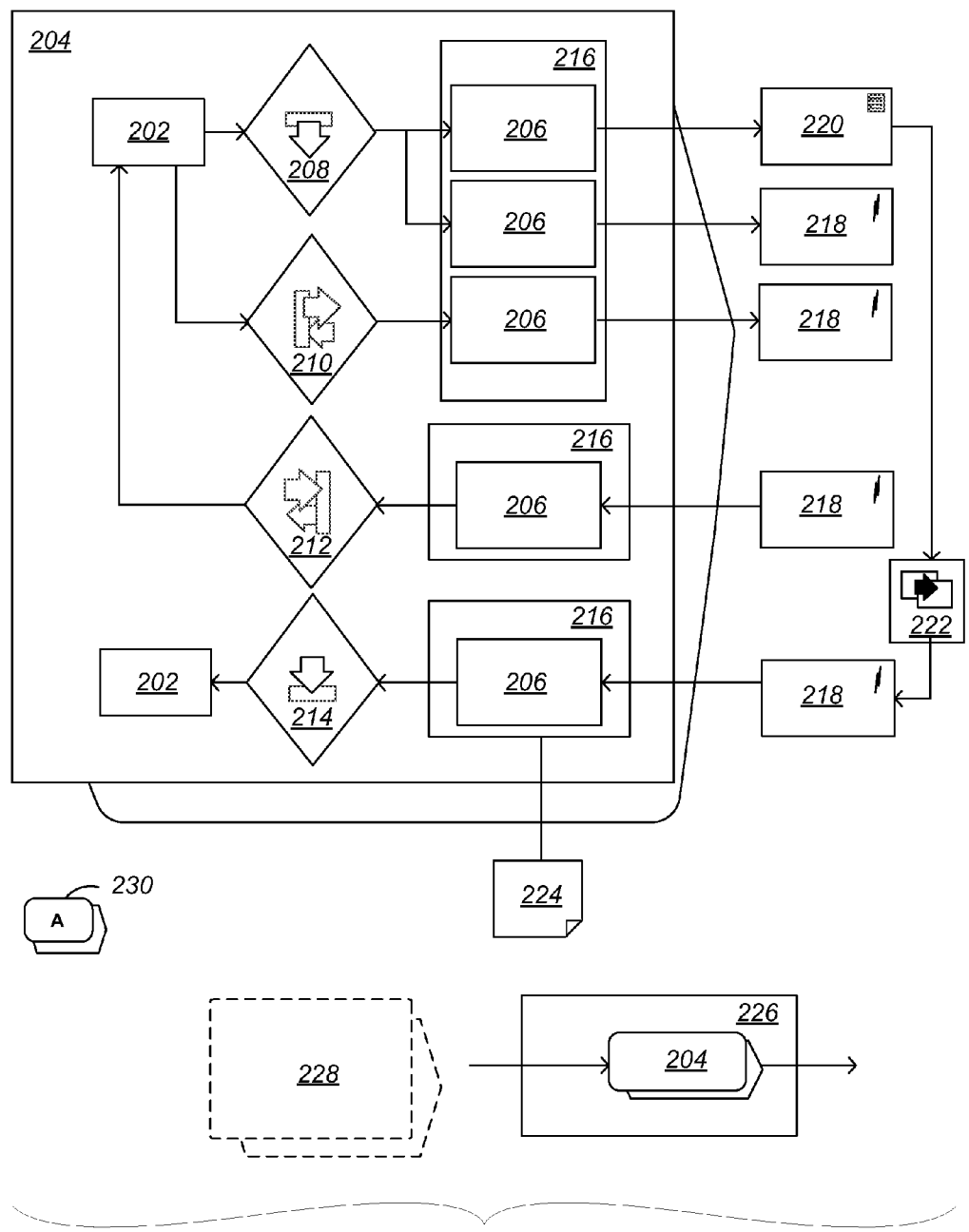
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226.

It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent.

The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Expense and Reimbursement Management" and "Due Item Processing"

Figure 3:
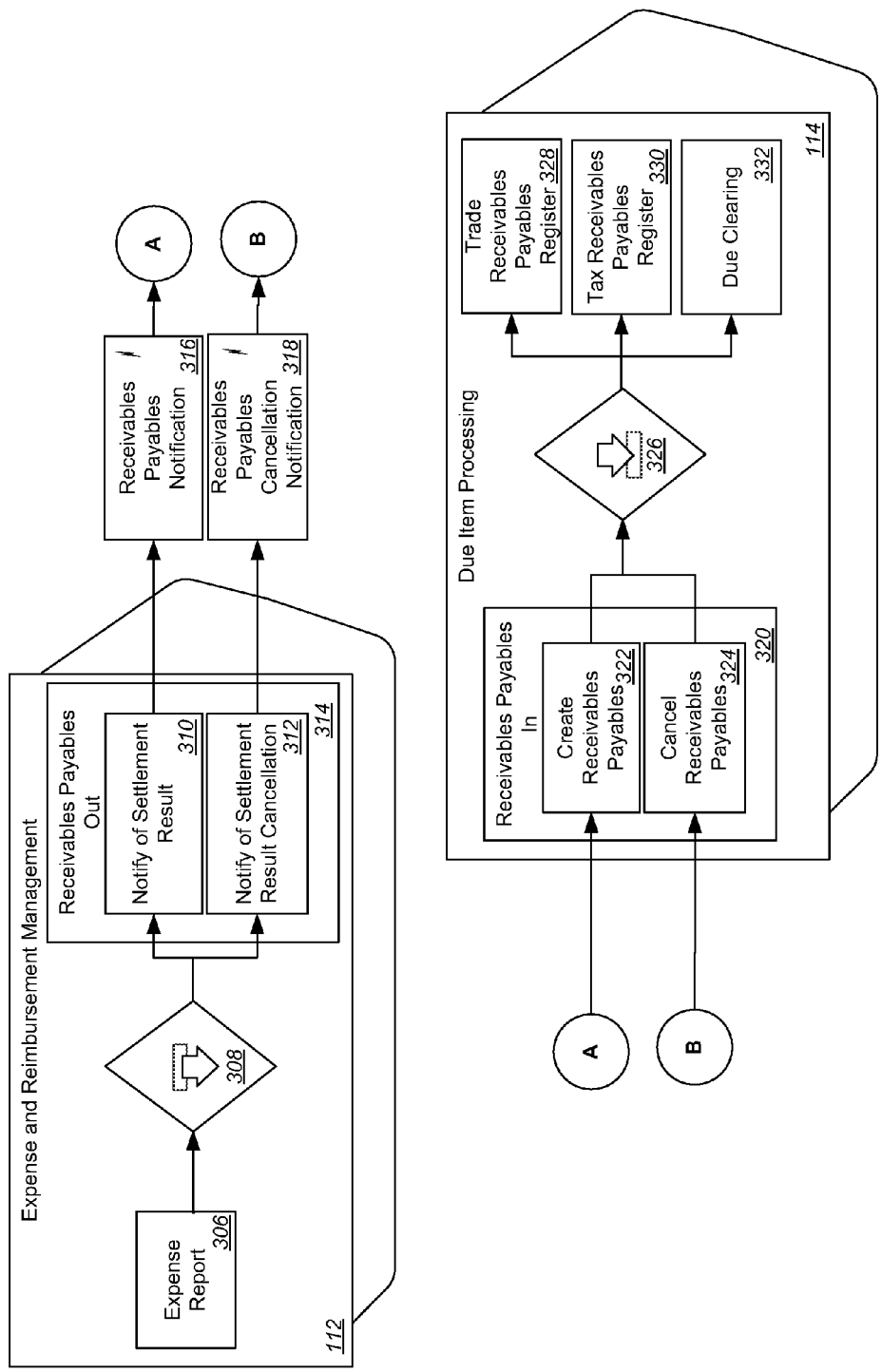
FIG. 3 is a block diagram showing interactions between an Expense and Reimbursement Management process component and a Due Item Processing process component.

FIG. 3 is a block diagram showing interactions between the Expense and Reimbursement Management process component 112 and the Due Item Processing process component 114 in the architectural design of FIG. 1. In some implementations, the interaction can start when an expense report is approved or canceled. The Expense and Reimbursement Management process component 112 may request the payment of reimbursement amounts from the Due Item Processing process component 114.

As shown in FIG. 3, the Expense and Reimbursement Management process component 112 includes an Expense Report business object 306. The Expense Report business object 306 may represent a list of receipts for the expenses incurred for the company within a certain period of time that are to be reimbursed to an expense reporter. In the case of a business trip, it may also contain the reason for the trip and/or general information such as destinations, dates and times, and/or mileages.

The Expense Report business object 306 may use a Notify of Settlement Result from Expense Report to Due Item Processing outbound process agent 308 to invoke a Notify of Settlement Result operation 310 and/or a Notify of Settlement Result Cancellation operation 312. The agent 308 may invoke the Notify of Settlement Result operation 310 to notify Receivables and Payables about the settlement results to reimburse for an expense. The agent 308 may invoke the Notify of Settlement Result Cancellation operation 312 to notify Receivables and Payables that an expense report was canceled. The operations 310 and 312 are included in a Receivables Payables Out interface 314. The operation 310 may send a Receivables Payables Notification message 316. The operation 312 may send a Receivables Payables Cancellation Notification message 318.

The Receivables Payables Notification message 316 may be received in a Create Receivables Payables operation 322. The Receivables Payables Cancellation Notification message 318 may be received in a Cancel Receivables Payables operation 324. The operations 322 and 324 are included in a Receivables Payables In interface 320. If the Receivables Payables Notification message 316 is received, then the Create Receivables Payables operation 322 can, in some implementations, be performed to create a trade and/or tax receivable or payable. If the Receivables Payables Cancellation Notification message 318 is received, then the Cancel Receivables Payables operation 324 can, in some implementations, be performed to cancel a trade and/or tax receivable or payable. The operations 322 and 324 may use a Maintain Trade and Tax Receivables Payables inbound process agent 326 to update one or more of three business objects such as a Trade Receivables Payables Register business object 328, a Tax Receivables Payables Register business object 330, and/or a Due Clearing business object 332. The Trade Receivables Payables Register business object 328 may represent the register of trade receivables and/or payables of a company to or from its business partners. The Tax Receivables Payables Register business object 330 may represent the register of tax receivables and/or payables of a company for the delivered goods and/or rendered services between buyers and sellers, the consumption of goods, the transfer of goods, and/or amounts withheld from payments to sellers. The Due Clearing business object 332 may represent a group of receivables and/or payables for clearing. "Clearing" can refer to the amounts of the receivables and/or payables of a group balance to zero, taking cash discounts and/or other deductions into account. The "group" can be payments and/or invoices that belong together, but it can also be credit memos and/or invoices, or customer and/or vendor invoices. A group can, in some implementations, result uniquely from the invoice reference information of a payment.

Interactions Between Process Components "Bank Statement Creation at Bank" and "Payment Processing"

Figure 4:
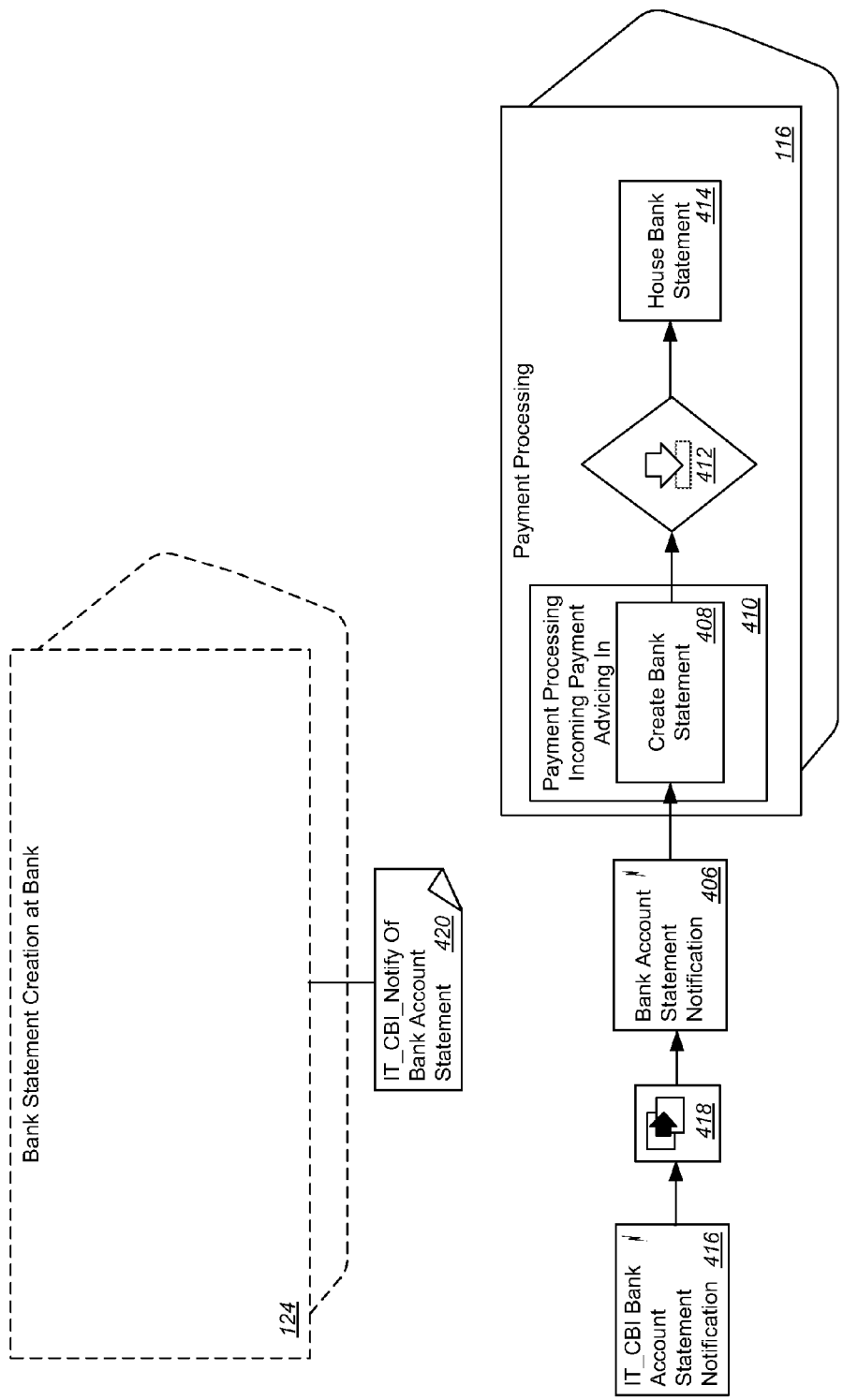
FIG. 4 is a block diagram showing interactions between a Bank Statement Creation at Bank process component and a Payment Processing process component.

FIG. 4 is a block diagram showing interactions between the Bank Statement Creation at Bank process component 124 and the Payment Processing process component 116 in the architectural design of FIG. 1. The interactions may start when a bank statement is created at a bank. The Bank Statement Creation at Bank process component 124 may notify the Payment Processing process component 116 about transactions on a bank account. In some implementations, a bank account statement can be in the format of the national electronic banking standard CBI (Corporate Banking Interbancario), established by the Italian Banking Association (ABI) and the major Italian (IT) banks.

As shown in FIG. 4, a bank statement may be created at a bank and an IT_CBI Bank Account Statement Notification message 416 with statement information may be generated. The IT_CBI Bank Account Statement Notification message 416 may use Mapping Entity 418 to transform the IT_CBI formatted message to a Bank Account Statement Notification message 406. The message 406 can, in some implementations, be received in the Payment Processing process component 116 where a Create Bank Statement operation 408 may be invoked to create a bank statement. The Create Bank Statement operation 408 is included in a Payment Processing Incoming Payment Advicing In interface 410. A Maintain Bank Statement inbound process agent 412 may update a House Bank Statement business object 414 by, for example, creating a new bank statement. The House Bank Statement business object 414 may represent a legally binding notification from the house bank about the revenues items within a specific time period at a house bank account with a defined starting and/or closing balance.

The Bank Statement Creation at Bank process component 124 may receive information from an IT_CBI_Notify Of Bank Account Statement communication channel template 420. The communication channel template 420 can, in some implementations, provide information from an external party about a bank statement.

Interactions Between Process Components "Due Item Processing" and "Accounting"

Figure 5:
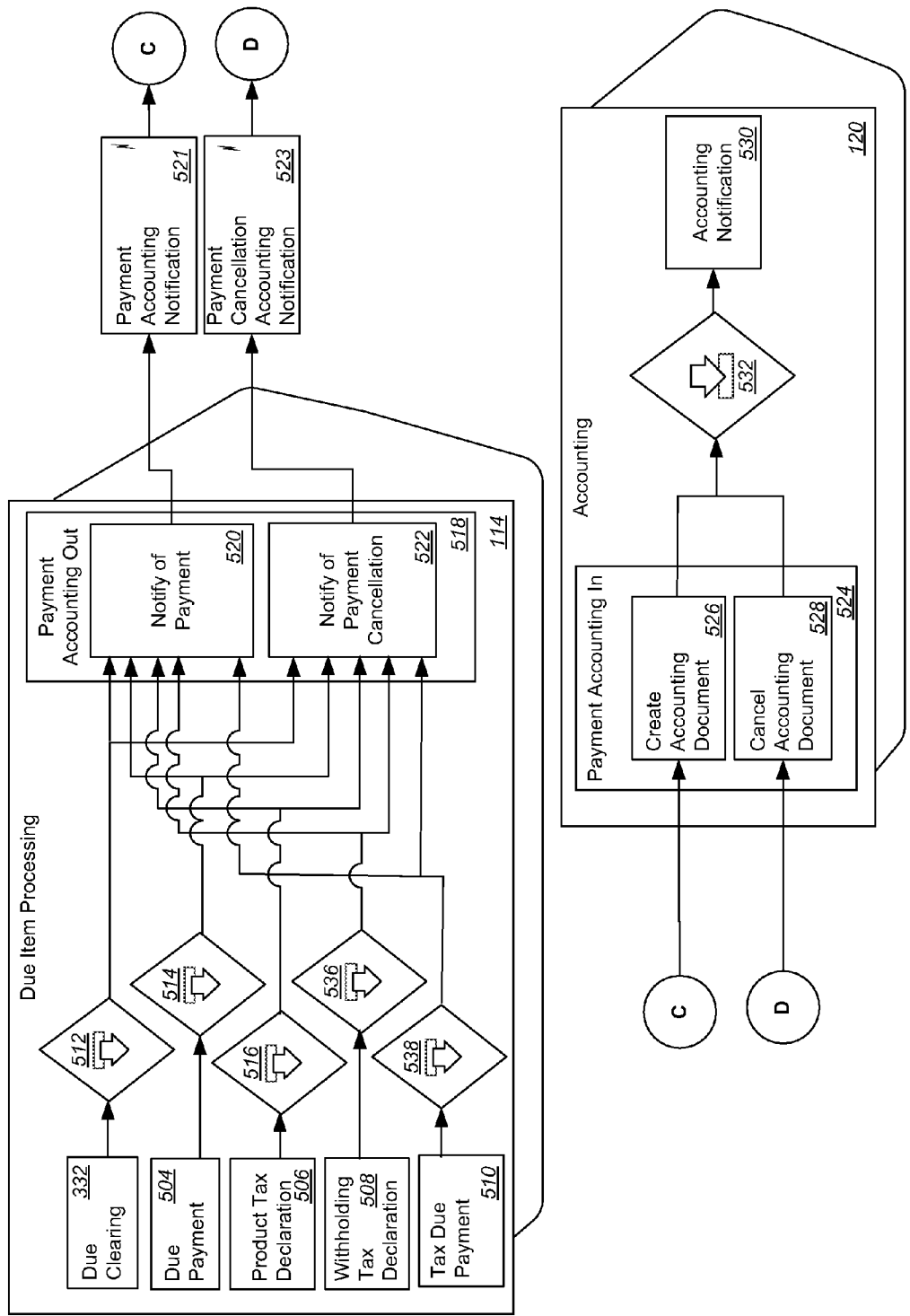
FIG. 5 is a block diagram showing interactions between a Due Item Processing process component and an Accounting process component.

FIG. 5 is a block diagram showing interactions between the Due Item Processing process component 114 and the Accounting process component 120 in the architectural design of FIG. 1. The interaction may start when a payment or clearing for trade or tax receivables and/or payables is created or cancelled. The Due Item Processing process component 114 notifies the Accounting process component 120 about the creation and/or cancellation of the payment or clearing.

As shown in FIG. 5, the Due Item Processing process component 114 includes the Due Clearing business object 332, a Due Payment business object 504, a Product Tax Declaration business object 506, a Withholding Tax Declaration business object 508, and a Tax Due Payment business object 510. The Due Clearing business object 332 may represent a group of receivables and/or payables for clearing. The Due Payment business object 504 may represent a payment request and/or payment confirmation with regard to trade receivables and payables. The Product Tax Declaration business object 506 may represent a declaration of the product tax payables and/or receivables of a company to the responsible tax authority, according to the tax declaration arrangement and/or country specific legal requirements that triggers the payment to the tax authority if required. The Withholding Tax Declaration business object 508 may represent a declaration of withholding tax payables of a company to a tax authority according to the tax declaration arrangement and/or country specific legal requirements. The Tax Due Payment business object 510 may represent a payment request and/or payment confirmation with regard to tax payables and receivables.

The Due Clearing business object 332 may use a Notify of Payment from Due Clearing to Accounting outbound process agent 512 to invoke a Notify of Payment operation 520 and/or a Notify of Payment Cancellation operation 522. The operations 520 and 522 are included in a Payment Accounting Out interface 518.

The Due Payment business object 504 may use a Notify of Payment from Due Payment to Accounting outbound process agent 514 to invoke the Notify of Payment operation 520 and/or the Notify of Payment Cancellation operation 522.

The Product Tax Declaration business object 506 may use a Notify of Payment from Product Tax Declaration to Accounting outbound process agent 516 to invoke the Notify of Payment operation 520 and/or the Notify of Payment Cancellation operation 522.

The Withholding Tax Declaration business object 508 may use a Notify of Payment from Withholding Tax Declaration to Accounting outbound process agent 536 to invoke the Notify of Payment operation 520 and/or the Notify of Payment Cancellation operation 522.

The Tax Due Payment business object 510 may use a Notify of Payment from Tax Due Payment to Accounting outbound process agent 538 to invoke the Notify of Payment operation 520 and/or the Notify of Payment Cancellation operation 522.

The Notify of Payment operation 520 may be invoked if a VAT (value added tax) declaration is released. The Notify of Payment Cancellation operation 522 may be invoked if the VAT declaration is cancelled.

If the Notify of Payment operation 520 is invoked, the operation 520 may generate a Payment Accounting Notification message 521. If the Notify of Payment Cancellation operation 523 is invoked, the operation 523 may generate a Payment Cancellation Accounting Notification message 523.

The Payment Accounting Notification message 521 may be received in a Create Accounting Document operation 526. The Create Accounting Document operation 526 may handle the Payment Accounting Notification message 521. The Create Accounting Document operation 526 is included in a Payment Accounting In interface 524.

The Payment Cancellation Accounting Notification message 523 may be received in a Cancel Accounting Document operation 528. The Cancel Accounting Document operation 528 may handle the Payment Cancellation Accounting Notification message 523. The Cancel Accounting Document operation 528 is included in the Payment Accounting In interface 524.

The Create Accounting Document operation 526 and the Cancel Accounting Document operation 528 may both use a Maintain Accounting Document based on Payment inbound process agent 532 to update an Accounting Notification business object 530. The Accounting Notification business object 530 may represent a notification sent to the Accounting process component 120 by an operational component regarding a business transaction. For example, the Accounting Notification business object 530 may represent this operational business transaction in a standardized form for all business transaction documents and may include the data needed to valuate the business transaction.

Interactions Between Process Components "Payment Processing" and "Payment Order Processing at House Bank"

Figure 6:
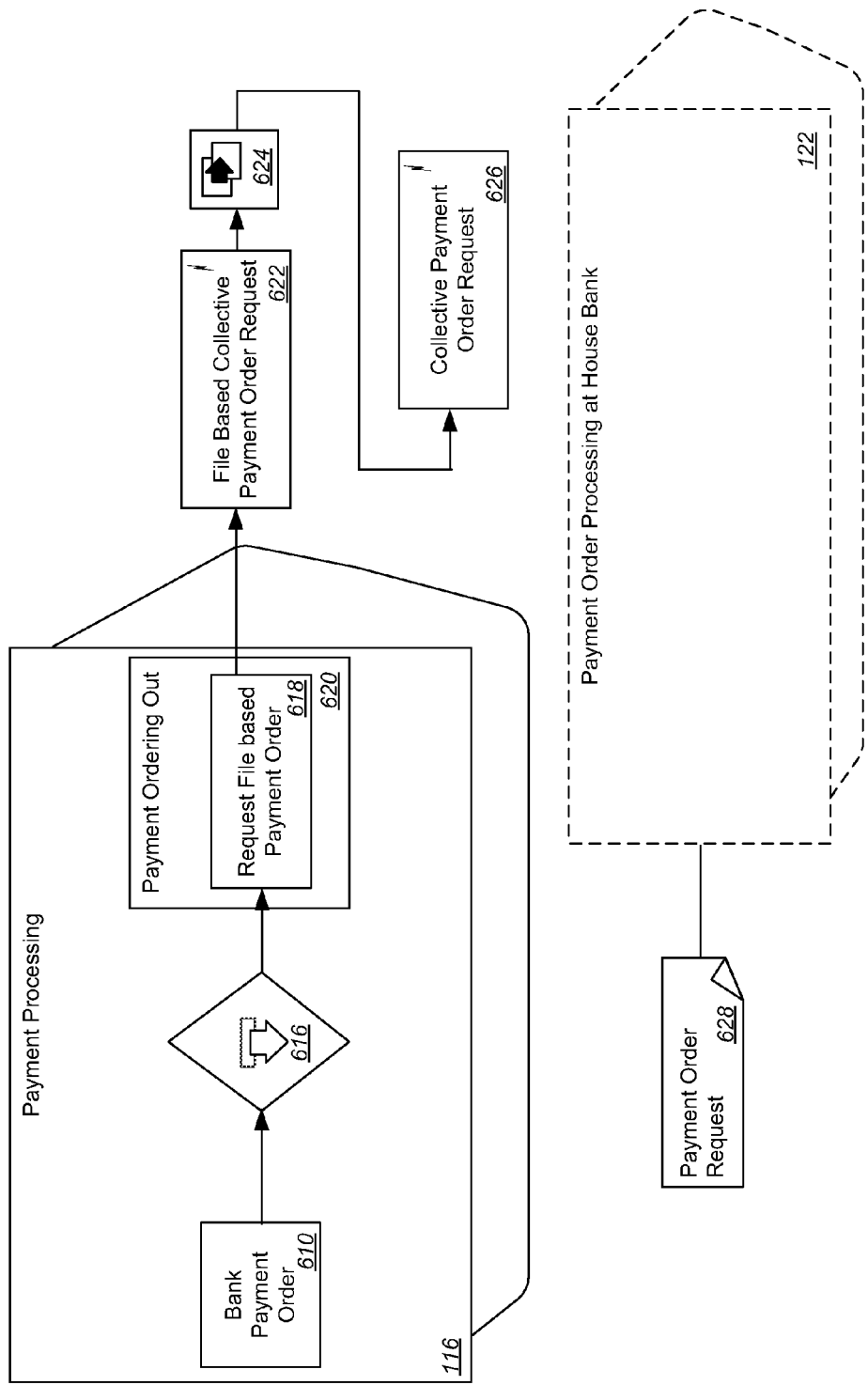
FIG. 6 is a block diagram showing interactions between a Payment Processing process component and a Payment Order Processing at House Bank process component.

FIG. 6 is a block diagram showing interactions between the Payment Processing process component 116 and the Payment Order Processing at House Bank process component 122 in the architectural design of FIG. 1.

As shown in FIG. 6, the Payment Processing process component 116 includes a Bank Payment Order business object 610. The Bank Payment Order business object 610 may represent an order to a house bank to make a transfer and/or direct debit from a specified house bank account to fulfill a payment order. The house bank can be a bank located in France.

The Bank Payment Order business object 610 may use a Request File Based Payment Order from Bank Payment Order to House Bank outbound process agent 616 to invoke a Request File based Payment Order operation 618. The Request File based Payment Order operation 618 may instruct a house bank, using a file, to make a bank transfer and/or a direct debit. The operation 618 is included in a Payment Ordering Out interface 620. The Request File based Payment Order operation 618 may generate a File based Collective Payment Order Request message 622. The File based Collective Payment Order Request message 622 may use Mapping Entity 624 to transform the file-based message type to a Collective Payment Order Request message 626 that can be received by the Payment Order Processing at House Bank process component 122. The Collective Payment Order Request message 626 may be in a format that the house bank (a bank located in France) can understand. A collective payment order may be an instruction based on a file transfer to a credit institution to carry out one or more payment transactions (e.g. bank transfers or direct debits). The Payment Order Processing at House Bank process component 122 may receive information from a Payment Order Request communication channel template 628. The communication channel template 628 may provide information from a third party about a payment order request.

Interactions Between Process Components "Expense and Reimbursement Management" and "Payroll Processing"

Figure 7:
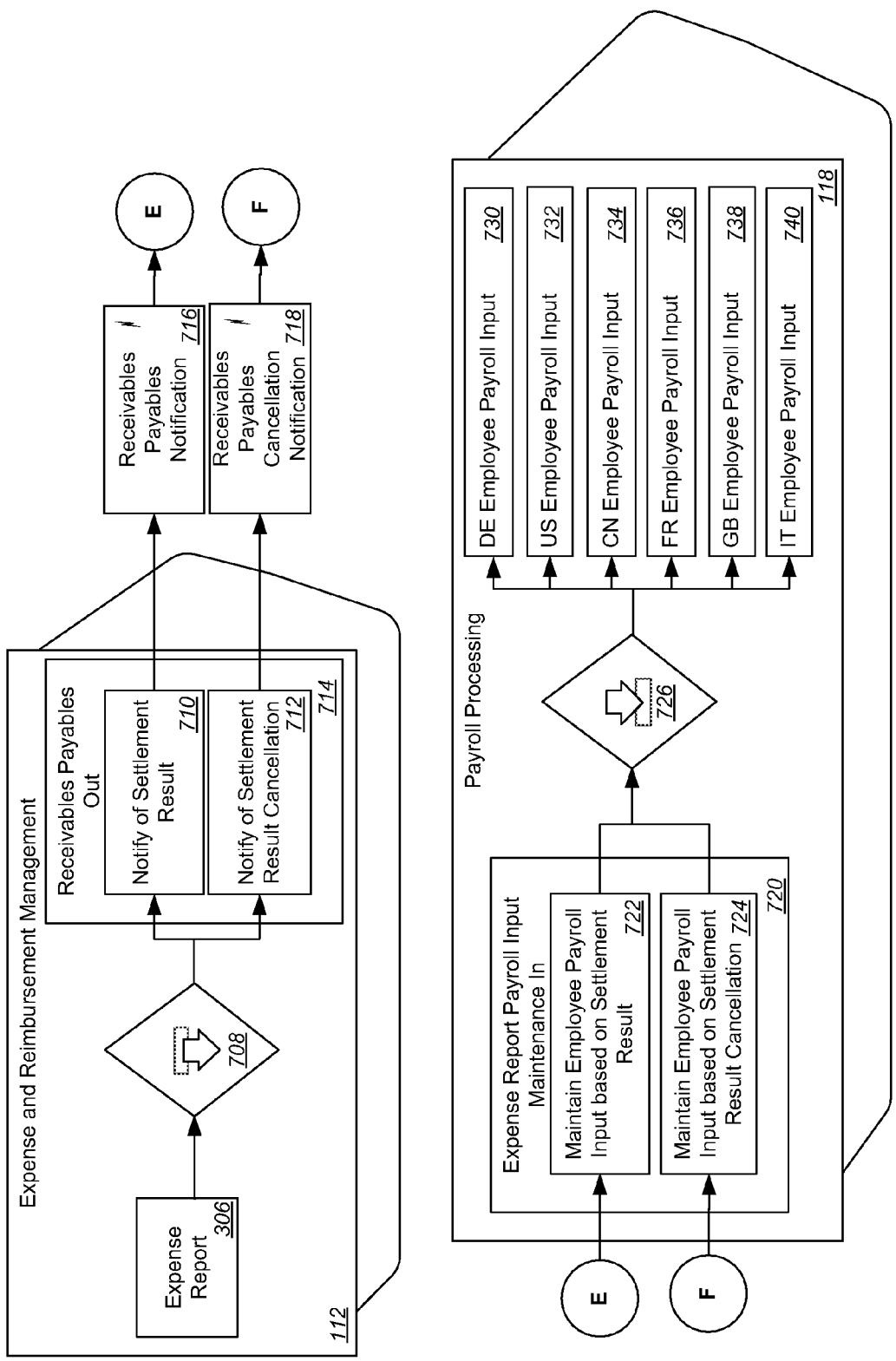
FIG. 7 is a block diagram showing interactions between an Expense and Reimbursement Management process component and a Payroll Processing process component.

FIG. 7 is a block diagram showing interactions between the Expense and Reimbursement Management process component 112 and the Payroll Processing process component 118 in the architectural design of FIG. 1. The interaction may start when an expense report is approved or canceled. The Expense and Reimbursement Management process component 112 may request the payment of reimbursement amounts from the Payroll Processing process component 118.

As shown in FIG. 7, the Expense and Reimbursement Management process component 112 includes the Expense Report business object 306. The Expense Report business object 306 may represent a list of receipts for the expenses incurred for the company within a certain period of time that are to be reimbursed to an expense reporter. In the case of a business trip, it may also contain the reason for the trip and general information such as destinations, dates and times, and/or mileages.

The Expense Report business object 306 may use a Notify of Settlement Result from Expense Report to Payroll Processing outbound process agent 708 to invoke a Notify of Settlement Result operation 710 and/or a Notify of Settlement Result Cancellation operation 712. The agent 708 may invoke the Notify of Settlement Result operation 710 to notify Payroll about settlement results in order to handle all amounts subject to taxation. The agent 708 may invoke the Notify of Settlement Result Cancellation operation 712 to notify Payroll about the cancellation of settlement results in order to handle all amounts subject to taxation.

The operations 710 and 712 are included in a Receivables Payables Out interface 714. The operation 710 may send a Receivables Payables Notification message 716. The operation 712 may generate a Receivables Payables Cancellation Notification message 718.

The Receivables Payables Notification message 716 may be received in a Maintain Employee Payroll Input based on Settlement Result operation 722. The Receivables Payables Cancellation Notification message 718 may be received in a Maintain Employee Payroll Input based on Settlement Result Cancellation operation 724. The operations 722 and 724 are included in an Expense Report in Payroll Input Maintenance In interface 720. If the Receivables Payables Notification message 716 is received, then the Maintain Employee Payroll Input based on Settlement Result operation 722 may be performed to create a trade and/or tax receivable or payable. If the Receivables Payables Cancellation Notification message 718 is received, then the Maintain Employee Payroll Input based on Settlement Result Cancellation operation 724 may be performed to cancel a trade and/or tax receivable or payable. The operations 722 and 724 may use a Maintain Employee Payroll Input based on Expense Report Settlement Result inbound process agent 726 to update one or more of six business objects including a DE Employee Payroll Input business object 730, a US Employee Payroll Input business object 732, a CN Employee Payroll Input business object 734, an FR Employee Payroll Input business object 736, a GB Employee Payroll Input business object 738, and/or an IT Employee Payroll Input business object 740. The DE Employee Payroll Input business object 730 may represent a summary of all employee-specific input for German payroll for one employee. The US Employee Payroll Input business object 732 may represent a summary of all employee-specific input for US payroll for one employee. The CN Employee Payroll Input business object 734 may represent a summary of all employee specific input for Chinese payroll for one employee. The FR Employee Payroll Input business object 736 may represent a summary of all employee specific input for French payroll for one employee. The GB Employee Payroll Input business object 738 may represent a summary of all employee specific input for Great Britain payroll for one employee. The IT Employee Payroll Input business object 740 may represent a summary of all employee specific input for Italian payroll for one employee.

Interactions Between Process Components "Expense and Reimbursement Management" and "Accounting"

Figure 8:
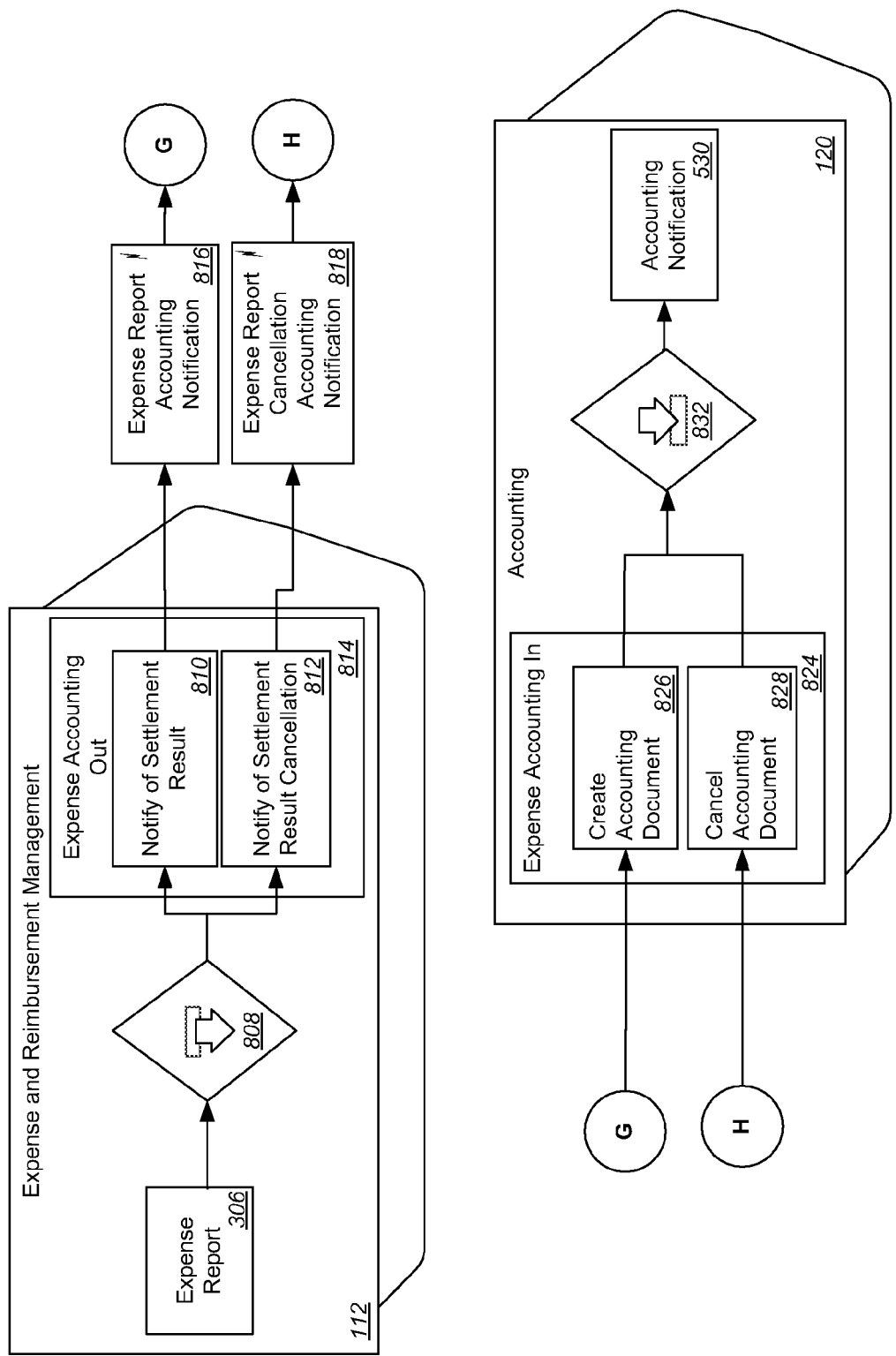
FIG. 8 is a block diagram showing interactions between an Expense and Reimbursement Management process component and an Accounting process component.

FIG. 8 is a block diagram showing interactions between the Expense and Reimbursement Management process component 112 and the Accounting process component 120 in the architectural design of FIG. 1. The interaction starts when an expense report is approved or canceled. The Expense and Reimbursement Management process component 112 may request the creation or cancellation of posting documents from the Accounting process component 120.

As shown in FIG. 8, the Expense and Reimbursement Management process component 112 includes the Expense Report business object 306. The Expense Report business object 306 may represent a list of receipts for the expenses incurred for the company within a certain period of time that are to be reimbursed to an expense reporter. In the case of a business trip, it may also contain the reason for the trip and general information such as destinations, dates and times, and/or mileages.

The Expense Report business object 306 may use a Notify of Settlement Result from Expense Report to Accounting outbound process agent 808 to invoke a Notify of Settlement Result operation 810 and/or a Notify of Settlement Result Cancellation operation 812. The agent 808 may invoke the Notify of Settlement Result operation 810 to notify Accounting about the settlement results to post the costs of an expense report. The agent 808 may invoke the Notify of Settlement Result Cancellation operation 812 to notify Accounting that an expense report was canceled. The operations 810 and 812 are included in an Expense Accounting Out interface 814. The operation 810 may send an Expense Report Accounting Notification message 816. The operation 812 may generate an Expense Report Cancellation Accounting Notification message 818.

The Expense Report Accounting Notification message 816 may be received in a Create Accounting Document operation 826. The Create Accounting Document operation 826 may handle the Expense Report Accounting Notification message 816. The Create Accounting Document operation 826 is included in an Expense Accounting In interface 824.

The Expense Report Cancellation Accounting Notification message 818 may be received in a Cancel Accounting Document operation 828. The Cancel Accounting Document operation 828 may handle the Expense Report Cancellation Accounting Notification message 818. The Cancel Accounting Document operation 828 may included in the Expense Accounting In interface 824.

The Create Accounting Document operation 826 and the Cancel Accounting Document operation 828 may both use a Maintain Accounting Document based on Expense inbound process agent 832 to update the Accounting Notification business object 530. The Accounting Notification business object 530 may represent a notification sent to the Accounting process component 120 by an operational component regarding a business transaction. For example, the Accounting Notification business object 530 may represent this operational business transaction in a standardized form for all business transaction documents and/or can include the data needed to valuate the business transaction.

Interactions Between Process Components "Payment Processing" and "Accounting"

Figure 9:
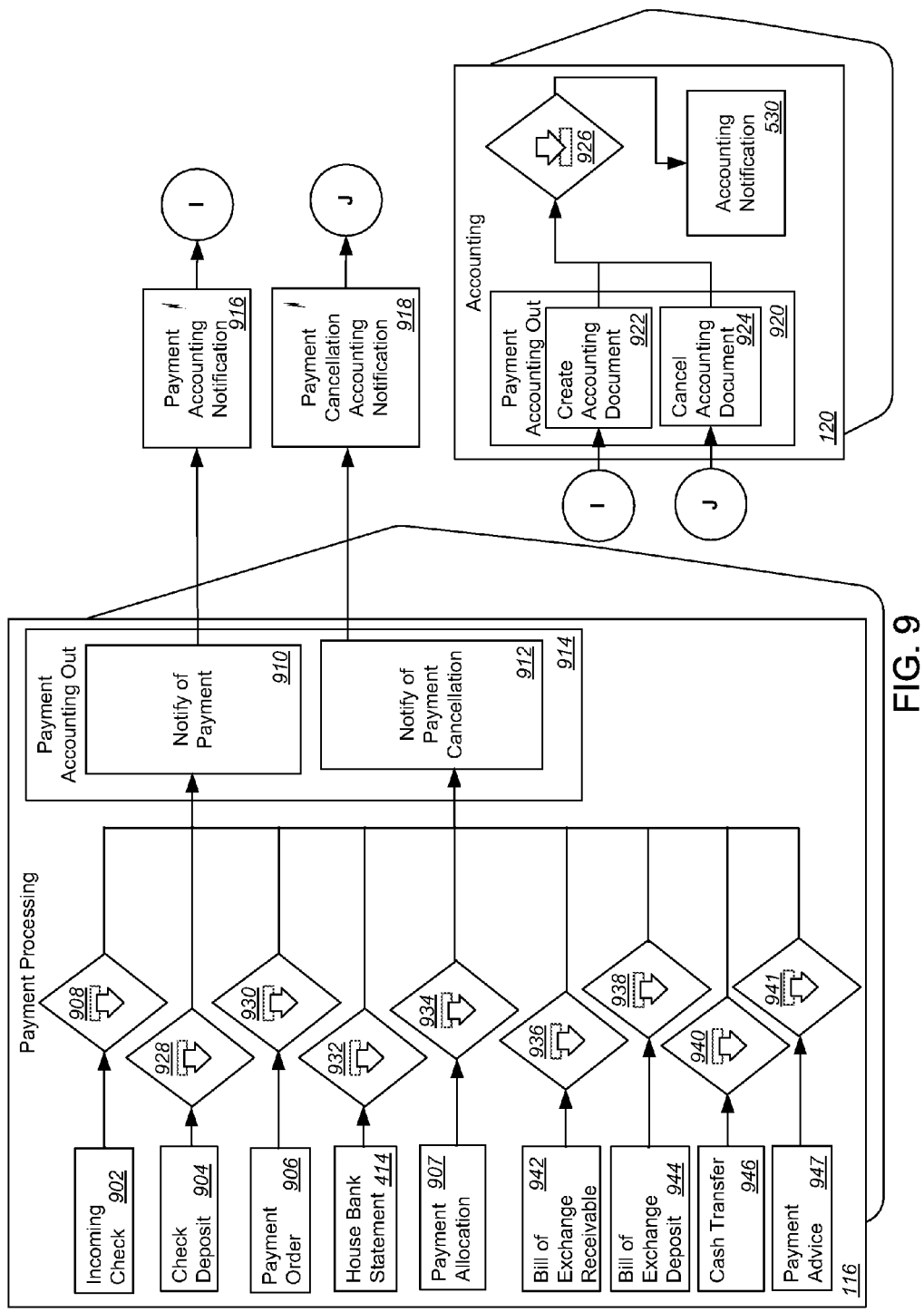
FIG. 9 is a block diagram showing interactions between a Payment Processing process component and an Accounting process component.

FIG. 9 is a block diagram showing interactions between the Payment Processing process component 116 and the Accounting process component 120 in the architectural design of FIG. 1. The interaction may start when a payment is ordered, received, allocated, and/or cancelled. The Payment Processing process component 116 can notify the Accounting process component 120 about the creation or cancellation of a payment ordered, received, and/or allocated.

As shown in FIG. 9, the Payment Processing process component 116 includes an Incoming Check business object 902, a Check Deposit business object 904, the Payment Order business object 906, the House Bank Statement business object 414, a Payment Allocation business object 907, a Bill of Exchange Receivable business object 942, a Bill of Exchange Deposit business object 944, a Cash Transfer business object 946, and a Payment Advice business object 947. The Incoming Check business object 902 may represent a check issued by a business partner payable to the company. The Check Deposit business object 904 may represent a deposit of checks at a house bank for credit to a house bank account. The Payment Allocation business object 907 may represent an assignment of a payment item to the payment reasons from which the payment item originated. The Payment Order business object 906 may represent an order within a company to make a payment to a business partner at a specified time. For example, a payment order may be a collective order that includes several individual orders. The House Bank Statement business object 414 may represent a legally binding notification from the house bank about the revenues (items) within a specific time period at a house bank account with a defined starting and closing balance. The Bill of Exchange Receivable business object 942 may represent a bill of exchange issued either by the company or by a business partner for the benefit of the company. The Bill of Exchange Deposit business object 944 may represent a deposit of bills of exchange receivable at a house bank for credit to a house bank account. The Cash Transfer business object 946 may represent a company-internal money transfer that can include the following payments: from one house bank account to another (house bank account transfer); from one cash storage to another (cash transfer); from a cash storage to a house bank account (cash deposit); and/or from a house bank account to a cash storage (cash withdrawal). The Payment Advice business object 947 may represent an announcement of a payment transaction by a business partner to the company, specifying payment reasons.

The Incoming Check business object 902 may use a Notify of Payment from Incoming Check to Accounting outbound process agent 908 to invoke a Notify of Payment operation 910 and/or a Notify of Payment Cancellation operation 912. The operations 910 and 912 are included in a Payment Accounting Out interface 914.

The Check Deposit business object 904 may use a Notify of Payment from Check Deposit to Accounting outbound process agent 928 to invoke the Notify of Payment operation 910 and/or the Notify of Payment Cancellation operation 912.

The Payment Order business object 906 may use a Notify of Payment from Payment Order to Accounting outbound process agent 930 to invoke the Notify of Payment operation 910 and/or the Notify of Payment Cancellation operation 912.

The House Bank Statement business object 414 may use a Notify of Payment from Bank Statement to Accounting outbound process agent 932 to invoke the Notify of Payment operation 910 and/or the Notify of Payment Cancellation operation 912.

The Payment Allocation business object 907 may use a Notify of Payment from Payment Allocation to Accounting outbound process agent 934 to invoke the Notify of Payment operation 910 and/or the Notify of Payment Cancellation operation 912.

The Bill of Exchange Receivable business object 942 may use a Notify of Payment from Bill of Exchange Receivable to Accounting outbound process agent 936 to invoke the Notify of Payment operation 910 and/or the Notify of Payment Cancellation operation 912.

The Bill of Exchange Deposit business object 944 may use a Notify of Payment from Bill of Exchange Deposit to Accounting outbound process agent 938 to invoke the Notify of Payment operation 910 and/or the Notify of Payment Cancellation operation 912.

The Cash Transfer business object 946 may use a Notify of Payment Cash Transfer to Accounting outbound process agent 940 to invoke the Notify of Payment operation 910 and/or the Notify of Payment Cancellation operation 912.

The Payment Advice business object 947 may use a Notify of Payment Advice to Accounting outbound process agent 941 to invoke the Notify of Payment operation 910 and/or the Notify of Payment Cancellation operation 912.

If the Notify of Payment operation 910 is invoked, the operation 910 may generate a Payment Accounting Notification message 916. If the Notify of Payment Cancellation operation 912 is invoked, the operation 912 may generate a Payment Cancellation Accounting Notification message 918.

A Create Accounting Document operation 922 may receive the Payment Accounting Notification message 916. A Cancel Accounting Document operation 924 may receive the Payment Cancellation Accounting Notification message 918. The operations 922 and 924 are included in a Payment Accounting Out interface 920. The operations 922 and 924 may use a Maintain Accounting Document based on Payment inbound process agent 926 to update the Accounting Notification business object 530. The Accounting Notification business object 530 may represent a notification sent to the Accounting process component 120 by an operational component regarding a business transaction. For example, the Accounting Notification business object 530 may represent the operational business transaction in a standardized form for all business transaction documents and/or can include the data needed to valuate the business transaction.

If the Notify of Payment operation 910 is invoked, then the Payment Accounting Notification message 916 may send to the Accounting process component 120 to update the Accounting Notification business object 530. If the Notify of Payment Cancellation operation 912 is invoked, then the Payment Cancellation Accounting Notification message 918 may send to the Accounting process component 120 to update the Accounting Notification business object 530.

Interactions Between Process Components "Due Item Processing" and "Payment Processing"

Figure 10A:
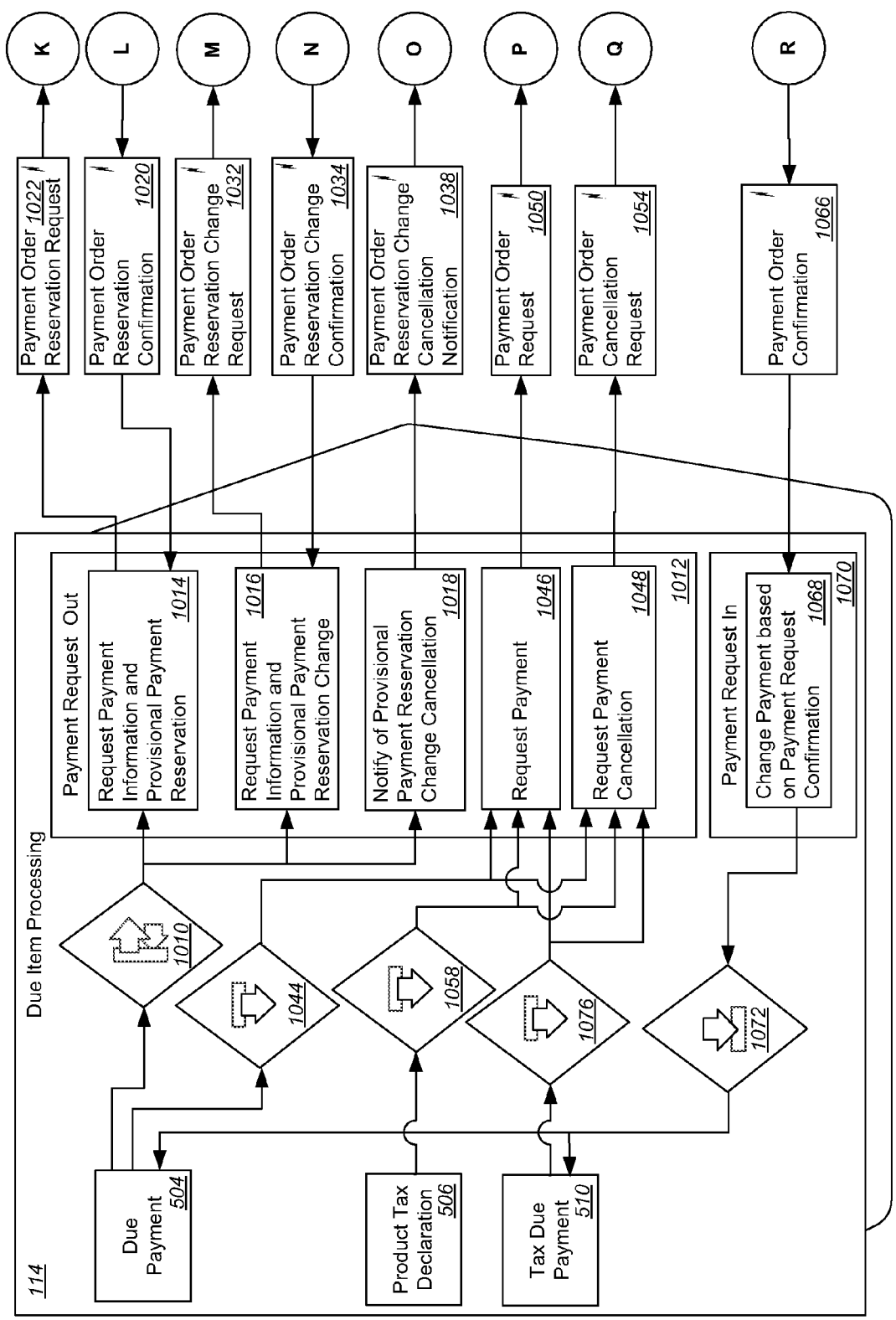
FIGS. 10A and 10B are block diagrams showing interactions between a Due Item Processing process component and a Payment Processing process component.
Figure 10B:
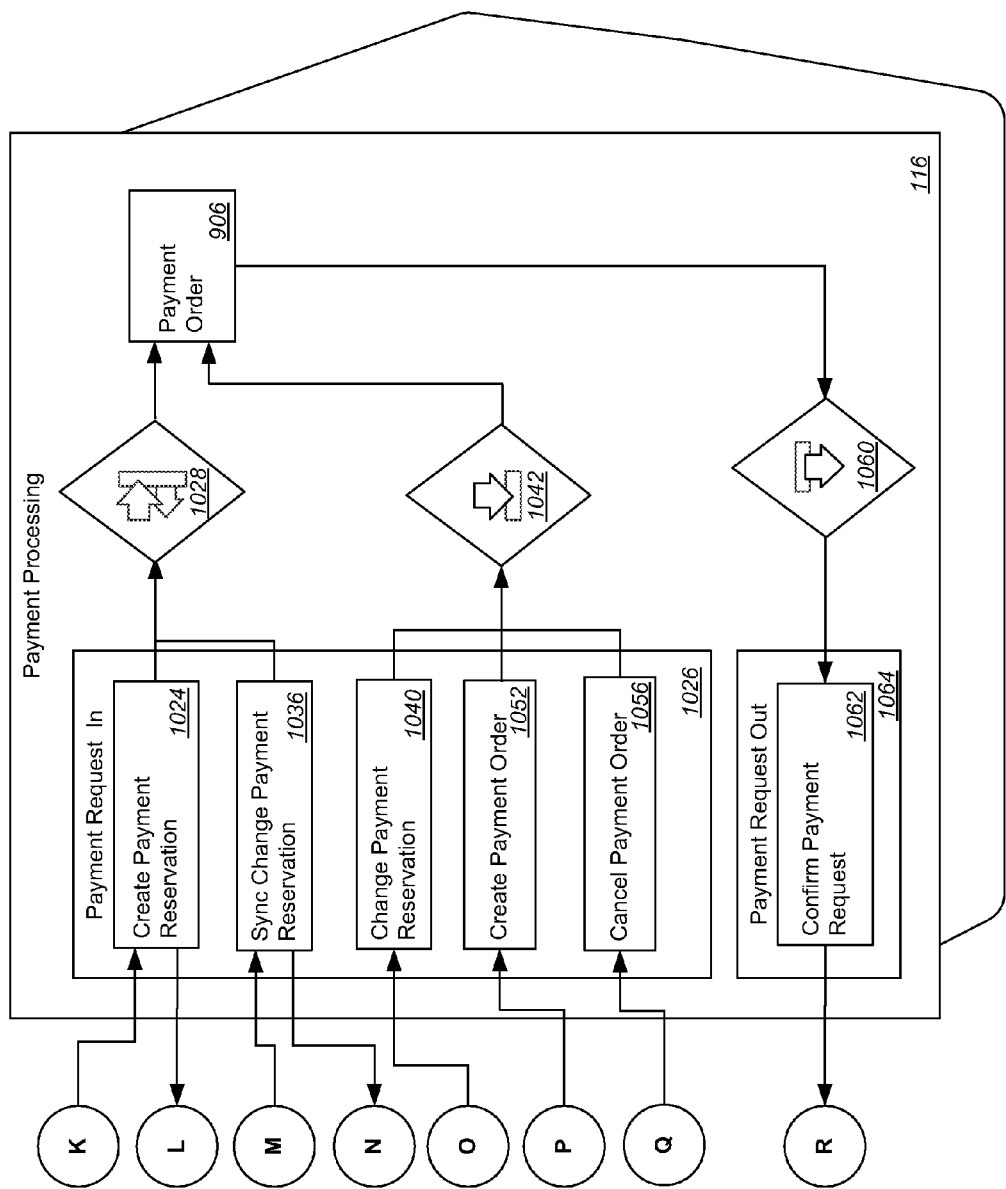

FIGS. 10A and 10B are block diagrams collectively showing interactions between the Due Item Processing process component 114 and the Payment Processing process component 116 in the architectural design of FIG. 1. The interaction may start when a payment for trade and/or tax receivables or payables is initiated or cancelled. The interaction may enable the Due Item Processing process component 114 to request a reservation and/or change a previously made reservation of cash from the Payment Processing process component 116 within the creation process. The Payment Processing process component 116 may confirm the creation and/or the change of a reservation immediately.

As shown in FIG. 10A, the Due Item Processing process component 114 includes the Due Payment business object 504, the Product Tax Declaration business object 506, and the Tax Due Payment business object 510. The Due Payment business object 504 may represent a payment request or payment confirmation with regard to trade receivables and payables. The Product Tax Declaration business object 506 may represent a declaration of the product tax payables and receivables of a company to the responsible tax authority according to the tax declaration arrangement, and/or country specific legal requirements that triggers the payment to the tax authority. The Tax Due Payment business object 510 may represent a payment request or payment confirmation with regard to tax payables and receivables.

The Due Payment business object 504 may use a Synchronous Request Payment Reservation from Due Payment to Payment Processing outbound process agent 1010 to invoke one or more operations including a Request Payment Information and Provisional Payment Reservation operation 1014, a Request Payment Information and Provisional Payment Reservation Change operation 1016, and/or a Notify of Provisional Payment Reservation Change Cancellation operation 1018. The operations 1014, 1016, and 1018 are included in a Payment Request Out interface 1012. The Request Payment Information and Provisional Payment Reservation operation 1014 may request payment information with a provisional reservation of money in payment processing. The Request Payment Information and Provisional Payment Reservation Change operation 1016 may request payment information with a change of provisional reservation of money in payment processing. The Notify of Provisional Payment Reservation Cancellation operation 1018 may register a change of a provisional payment to the last transactional or saved state.

If the Request Payment Information and Provisional Payment Reservation operation 1014 is invoked, the operation 1014 may generate a Payment Order Reservation Request message 1022. If the Request Payment Information and Provisional Payment Reservation Change operation 1016 is invoked, the operation 1016 may generate a Payment Order Reservation Change Request message 1032. If the Notify of Provisional Payment Reservation Change Cancellation operation 1018 is invoked, the operation 1018 may generate a Payment Order Reservation Change Cancellation Notification message 1038.

The Due Payment business object 504 may also use a Request Payment from Due Payment to Payment Processing outbound process agent 1044 to invoke a Request Payment operation 1046 and/or a Request Payment Cancellation operation 1048. The operations 1046 and 1048 are included in the Payment Request Out interface 1012. The Request Payment operation 1046 may send a request for payment to the Payment Processing process component 116. This may confirm a previously made provisional payment. The Request Payment Cancellation operation 1048 may cancel at least one provisional, requested, and/or ordered payment. If the Request Payment operation 1046 is invoked, a Payment Order Request message 1050 may be generated. If the Request Payment Cancellation operation 1048 is invoked, the operation 1048 may generate a Payment Order Cancellation Request message 1054.

The Product Tax Declaration business object 506 may use a Request Payment from Product Tax Declaration to Payment Processing outbound process agent 1058 to invoke the Request Payment operation 1046 and/or the Request Payment Cancellation operation 1048. If the Request Payment operation 1046 is invoked, the Payment Order Request message 1050 may be generated. If the Request Payment Cancellation operation 1048 is invoked, the operation 1048 may generate the Payment Order Cancellation Request message 1054.

The Tax Due Payment business object 510 may use a Request Payment from Tax Due Payment to Payment Processing outbound process agent 1076 to invoke the Request Payment operation 1046 and/or the Request Payment Cancellation operation 1048. If the Request Payment operation 1046 is invoked, the Payment Order Request message 1050 may be generated. If the Request Payment Cancellation operation 1048 is invoked, the operation 1048 may generate the Payment Order Cancellation Request message 1054.

As shown in FIG. 10B, a Create Payment Reservation operation 1024 may receive the Payment Order Reservation Request message 1022. The operation 1024 may use a synchronous Request Payment Reservation from Due Payment to Payment Processing inbound process agent 1028 to create, change, and/or cancel a payment order for a reservation request. The synchronous inbound process agent 1028 may update the Payment Order business object 906. The Payment Order business object 906 may represent an order within a company to make a payment to a business partner at a specified time. A payment order may be a collective order that includes several individual orders.

A Synchronous Change Payment Reservation operation 1036 may receive a Payment Order Reservation Change Request message 1032. The operation 1036 may use the synchronous Request Payment Reservation from Due Payment to Payment Processing inbound process agent 1028 to update the Payment Order business object 906.

A Change Payment Reservation operation 1040 may receive the Payment Order Reservation Change Cancellation Notification message 1038. A Create Payment Order operation 1052 may receive the Payment Order Request message 1050. A Cancel Payment Order operation 1056 may receive the Payment Order Cancellation Request message 1054. The operations 1040, 1052, and 1056 may use a Maintain Payment Order inbound process agent 1042 to update the Payment Order business object 906. The Cancel Payment Order operation 1056 may cancel a previously sent payment request by reference. The Create Payment Order operation 1052 may create a request for payment. The Change Payment Reservation operation 1040 may change a reservation of payment without confirmation to the caller. The operations 1024, 1036, 1040, 1052, and 1056 are included in a Payment Request In interface 1026.

The Payment Order business object 906 may use a Confirm Payment Request from Payment Order to Due Item Processing outbound process agent 1060 to invoke a Confirm Payment Request operation 1062. The operation 1062 may confirm a processing status of a payment to a sender. The operation 1062 is included in a Payment Request Out interface 1064. The Confirm Payment Request operation 1062 may generate a Payment Order Confirmation message 1066.

As shown in FIG. 10A, the Payment Order Confirmation message 1066 may be received in a Change Payment based on Payment Request Confirmation operation 1068. The operation 1068 may confirm the execution of a payment request or a payment request cancellation. The operation 1068 is included in a Payment Request In interface 1070. The Change Payment based on Payment Request Confirmation operation 1068 may use a Change Payment based on Payment Request Confirmation inbound process agent 1072 to update the Due Payment business object 504.

The Create Payment Reservation 1024 operation (shown in FIG. 10B) may send a Payment Order Reservation Confirmation message 1020 to the Due Item Processing process component 114 (shown in FIG. 10A). The message 1020 may be a confirmation response received in the Request Payment Information and Provisional Payment Reservation operation 1014.

The Synchronous Change Payment Reservation operation 1036 (shown in FIG. 10B) may send a Payment Order Reservation Change Confirmation message 1034 to the Due Item Processing process component 114 (shown in FIG. 10A). The message 1034 may be a confirmation response received in the Request Payment Information and Provisional Payment Reservation Change operation 1016.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file.

A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the software architecture design or of what may be claimed, but rather as an exemplification of preferred embodiments of the software architecture design. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising application software encoded on a non-transitory, tangible machine-readable information medium, the application software being structured as process components interacting with each other through service interfaces, the software comprising:
   a plurality of process components, each of the process components being a package of software implementing a respective and distinct business process, the plurality of process components including:
      an expense and reimbursement management process component that involves management and monitoring of expenses incurred by employees, and reimbursement of such expenses to employees;
      a due item processing process component that involves collection, management, and monitoring of trade receivables or payables and corresponding sales tax or withholding tax;
      a payment processing process component that involves processing and management of all payments;
      a payroll processing process component that involves execution and monitoring of regular as well as off-cycle payroll processes; and
      an accounting process component that records all relevant business transactions for valuation and profitability analysis; and
   a plurality of service operations, each service operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:
    the expense and reimbursement management process component and the due item processing process component;
    a bank statement creation at bank process component and the payment processing process component;
    the due item processing process component and the accounting process component;
    the payment processing process component and a payment order processing at house bank process component;
    the expense and reimbursement management process component and the payroll processing process component;
    the expense and reimbursement management process component and the accounting process component;
    the payment processing process component and the accounting process component; and
    the due item processing process component and the payment processing process component; and
    a plurality of process agents, each process agent being either an inbound process agent or an outbound process agent, an inbound process agent being operable to receive a message from an inbound operation, an outbound process agent being operable to cause an outbound operation to send a message, and each process agent being associated with exactly one process component.

2. The product of claim 1, wherein:
    each of the plurality of process components is assigned to exactly one deployment unit among multiple deployment units, and each deployment unit is deployable on a separate computer hardware platform independent of every other deployment unit; and
    all interaction between a process component in one deployment unit and any other process component in any other deployment unit takes place through respective service interfaces of the two process components.

3. The product of claim 1, wherein the deployment units comprise:
    an expense and reimbursement management deployment unit that includes the expense and reimbursement management process component;
    a due item management deployment unit that includes the due item processing process component;
    a payment deployment unit that includes the payment processing process component;
    a payroll deployment unit that includes the payroll processing process component; and
    a financial accounting deployment unit that includes the accounting process component.

4. The product of claim 1, wherein:
    each of the process components includes one or more business objects; and
    none of the business objects of any one of the process components interacts directly with any of the business objects included in any of the other process components.

5. The product of claim 4, wherein the business objects comprise a business process object.

6. The product of claim 4, wherein none of the business objects included in any one of the process components is included in any of the other process components.

7. The product of claim 1, wherein the inbound process agents comprise a first inbound process agent operable to start the execution of a business process step requested in a first inbound message by creating or updating one or more business object instances.

8. The product of claim 1, wherein the outbound process agents comprise a first asynchronous outbound process agent that is called after a business object that is associated with the first outbound process agent changes.

9. The product of claim 1, wherein the operations comprise synchronous and asynchronous operations.

10. A system, comprising:
    a computer system comprising one or more hardware platforms for executing a computer software application;
    a plurality of process components, each of the process components being a package of software implementing a respective and distinct business process, the plurality of process components including:
        an expense and reimbursement management process component that involves management and monitoring of expenses incurred by employees, and reimbursement of such expenses to employees;
        a due item processing process component that involves collection, management, and monitoring of trade receivables or payables and corresponding sales tax or withholding tax;
        a payment processing process component that involves processing and management of all payments;
        a payroll processing process component that involves execution and monitoring of regular as well as off-cycle payroll processes; and
        an accounting process component that records all relevant business transactions for valuation and profitability analysis; and
    a plurality of service operations, each service operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:
        the expense and reimbursement management process component and the due item processing process component;
        a bank statement creation at bank process component and the payment processing process component;
        the due item processing process component and the accounting process component;
        the payment processing process component and a payment order processing at house bank process component;
        the expense and reimbursement management process component and the payroll processing process component;
        the expense and reimbursement management process component and the accounting process component;
        the payment processing process component and the accounting process component; and the due item processing process component and the payment processing process component; and a plurality of process agents, each process agent being either an inbound process agent or an outbound process agent, an inbound process agent being operable to receive a message from an inbound operation, an outbound process agent being operable to cause an outbound operation to send a message, and each process agent being associated with exactly one process component.

11. The system of claim 10, wherein:

each of the process components includes one or more business objects; and none of the business objects of any one of the process components interacts directly with any of the business objects included in any of the other process components.

12. The system of claim 10, wherein none of the business objects included in any one of the process components is included in any of the other process components.

13. The system of claim 10, the system comprising multiple hardware platforms, wherein:

the expense and reimbursement management process component is deployed on a first hardware platform;

the due item processing process component is deployed on a second hardware platform;

the payment processing process component is deployed on a third hardware platform;

the payroll processing process component is deployed on a fourth hardware platform; and the accounting process component is deployed on a fifth hardware platform.

14. The system of claim 13, wherein each of the first through the fifth hardware platforms are distinct and separate from each other.

15. A computer-implemented method performed by one or more processors for developing a computer software application, comprising:

using the one or more processors to obtain in a computer system digital data representing an architectural design for a set of processes implementing an end-to-end application process, the design specifying a process component for each process in the set of processes, a set of process component interactions, and a plurality of process agents, wherein:

the specified process components include:

an expense and reimbursement management process component that involves management and monitoring of expenses incurred by employees, and the reimbursement of such expenses to employees;

a due item processing process component that involves collection, management, and monitoring of trade receivables or payables and corresponding sales tax or withholding tax;

a payment processing process component that involves processing and management of all payments;

a payroll processing process component that involves execution and monitoring of regular as well as off-cycle payroll processes; and an accounting process component that records all relevant business transactions for valuation and profitability analysis; and the process component interactions include interactions between:

the expense and reimbursement management process component and the due item processing process component;

a bank statement creation at bank process component and the payment processing process component;

the due item processing process component and the accounting process component;

the payment processing process component and a payment order processing at house bank process component;

the expense and reimbursement management process component and the payroll processing process component;

the expense and reimbursement management process component and the accounting process component;

the payment processing process component and the accounting process component; and the due item processing process component and the payment processing process component; and using the design including the specified process components and the specified process component interactions to develop a computer software application to perform the set of processes; and each of the plurality of process agents is either an inbound process agent or an outbound process agent, an inbound process agent being operable to receive a message from an inbound operation, an outbound process agent being operable to cause an outbound operation to send a message, and each process agent being associated with exactly one process component.

16. The method of claim 15, wherein each process in the set of processes is a business process transforming a defined business input into a defined business outcome.

17. The method of claim 16, wherein obtaining digital data representing the architectural design further comprises editing the design before using the design.

* * * * *